May 18, 1926.  
J. E. BLAND  
1,585,460

FUEL TANK

Filed April 27, 1925

Inventor  
John E. Bland  
By Walter F. Rogers  
His Attorney

Patented May 18, 1926.

1,585,460

UNITED STATES PATENT OFFICE.

JOHN E. BLAND, OF ARDMORE, OKLAHOMA.

FUEL TANK.

Application filed April 27, 1925. Serial No. 26,205.

This invention relates to an improvement in fuel tanks for automobiles.

The invention is particularly adapted to a tank having a flat bottom, wherein the bottom is provided with a channel extending longitudinally and centrally of the tank, and having flutes extending from the edges of the channel to the side walls of the tank.

The flutes will catch the sediment, water and foreign matter contained in the fuel or gasoline and cause it to migrate to the channel in the bottom, where it will be controlled by the flutes and channels and assist in directing the sediment and foreign matter into the devised trap or receptacle attached to the tank to prevent it from getting into the feed lines and carburetor. Such as disclosed in my Patent No. 1,518,686 of December 9, 1924.

The invention consists of certain novel features of construction and combination of parts which will be hereinafter described and pointed out in the claims.

Figure 1:
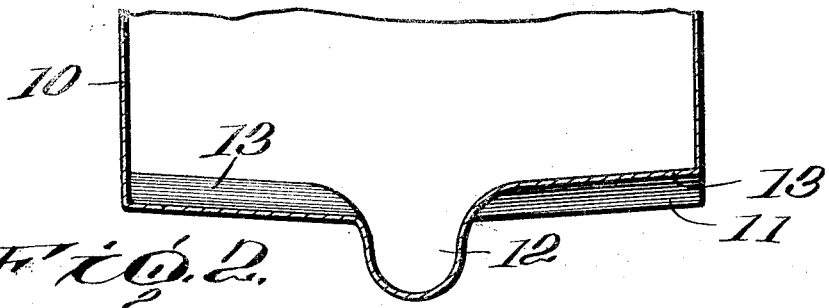
Figure 1 is a view in vertical cross section through the tank.
Figure 2:
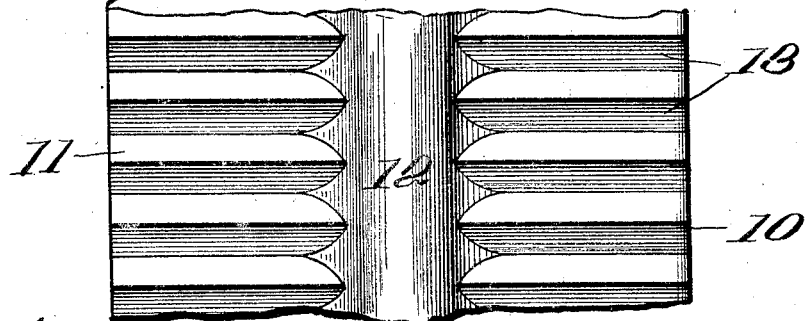
Figure 2 is a detail botom plan view.
Figure 3:
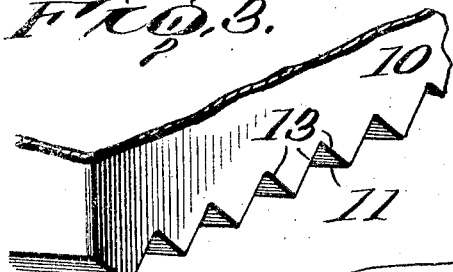
Figure 3 is a detail view in vertical section through the bottom of the tank.
Figure 4:
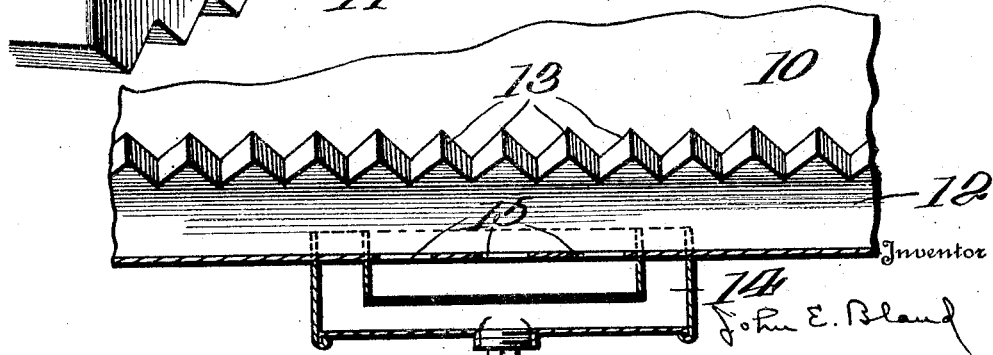
Figure 4 is a view in vertical section showing the tank with a sediment trap attached thereto.

The tank 10 shown, is provided with a flat bottom 11, preferably having a slight pitch to the center, and located centrally of the bottom, a longitudinal channel 12, is formed, which is preferably one-fourth of an inch in depth and three-fourths of an inch wide.

Extending from both edges of the channel and transversely of the bottom 11, are a number of parallel flutes or ridges 13, 13. The flutes are preferably one-half of an inch in height, and the distance between the adjacent flutes at their apexes is one-half of an inch and preferably one-fourth of an inch at the base. The flutes are triangularly shaped in cross section and are formed in the bottom and side walls. In employing flat bottom tanks it is preferred to give the bottom a slight pitch to the center as the flutes and channels are formed, thereby producing a direct drain to the channel.

When this tank is employed in connection with the trap 14, such as shown in my Patent No. 1,518,686, the channel 12 will be provided with slots or holes 15, so that the sediment and water may be discharged through the openings 15, into the trap 14.

It will be seen from the foregoing that a main or longitudinal channel is formed in the bottom of the tank into which lead a number of lateral channels radiating from each edge of the main channel and formed in the bottom and side walls of the tank.

Having described my invention, what I claim as new and desire to secure by Letters Patent is:

1. A fuel tank comprising a bottom having a channel formed therein and extending lengthwise thereof, and a series of transverse channels leading to the main channel, said transverse channels being formed by ridges struck up from the bottom.

2. A fuel tank comprising a bottom having a main channel formed therein and extending lengthwise thereof, and a series of flutes formed in the bottom in parallel relation, and extending from the edges of the main channel across the bottom, said flutes forming channels for directing the sediment to the main channel.

3. A fuel tank comprising a bottom having a central longitudinal channel formed therein, said bottom having a slight pitch from its edges to the channel, and a series of transverse channels formed in the bottom on each side of the longitudinal channel and leading to the said channel, said transverse channels being formed by ridges struck up from the bottom.

JOHN E. BLAND.